Aug. 25, 1931.  J. C. MONN ET AL  1,820,362

HYDRAULIC BRAKE

Filed March 6, 1929

Inventors
W. H. MILLER
J. C. MONN

By

Attorney

Patented Aug. 25, 1931

1,820,362

UNITED STATES PATENT OFFICE

JAMES C. MONN, OF HARRISBURG, AND WILLIAM H. MILLER, OF PENBROOK, PENNSYLVANIA

HYDRAULIC BRAKE

Application filed March 6, 1929. Serial No. 344,878.

This invention relates to an improvement in hydraulic brakes and particularly to a means whereby the manually responsive pressure cylinders and the system controlled thereby are wholly independent one of the other and a system replenishing means is selectively serviceable for any depleted independent system without affecting or being affected by any of the other systems.

In hydraulic brake systems, the brake proper is actuated by a brake cylinder having communication with a pressure cylinder responsive to manually controlled means and by means of which pressure is supplied to the independent brake cylinders. A highly important characteristic of brakes of this character is the uniformity of pressure at the individual brakes to secure a uniform braking action. Heretofore this result has been attained by providing such communication between the respective independent systems as will tend in a measure to equalize the pressure in all systems. This is of questionable advantage when it is considered that a leakage in any one system will thereby naturally reduce the effective pressure of the other systems.

The primary object of the present invention, therefore, is to maintain the respective brake systems completely independent and yet uniformly and similarly responsive to manually induced pressure, so that a uniform pressure is exerted in all systems, combined with a replenishing system which has independent communication with each of the brake systems and which may act to replenish the fluid in any one of such systems to the exclusion of the others, whereby under leakage in one system, the complete independence of the systems avoids a drop in pressure in any of the remaining systems, and yet such leaking system when repaired may be readily and independently recharged without affecting any of the other systems in any particular.

The invention is illustrated in the accompanying drawings, in which.

Figure 1:
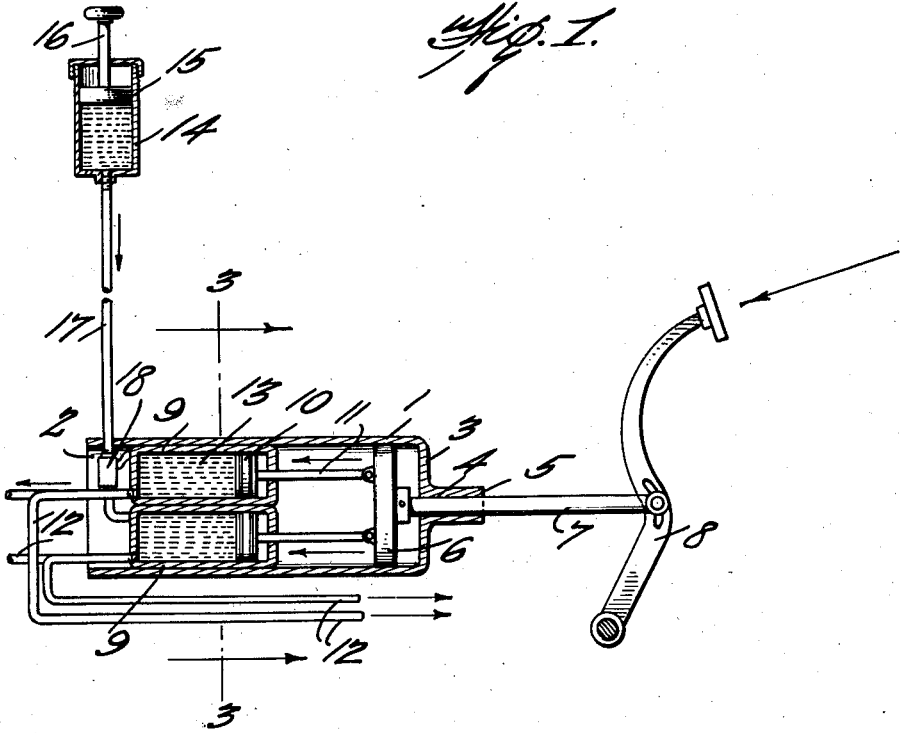
Figure 1 is a view in section, partly in elevation, illustrating the improved brake system in those particulars with which the present invention is concerned.
Figures 2, 3, 4:
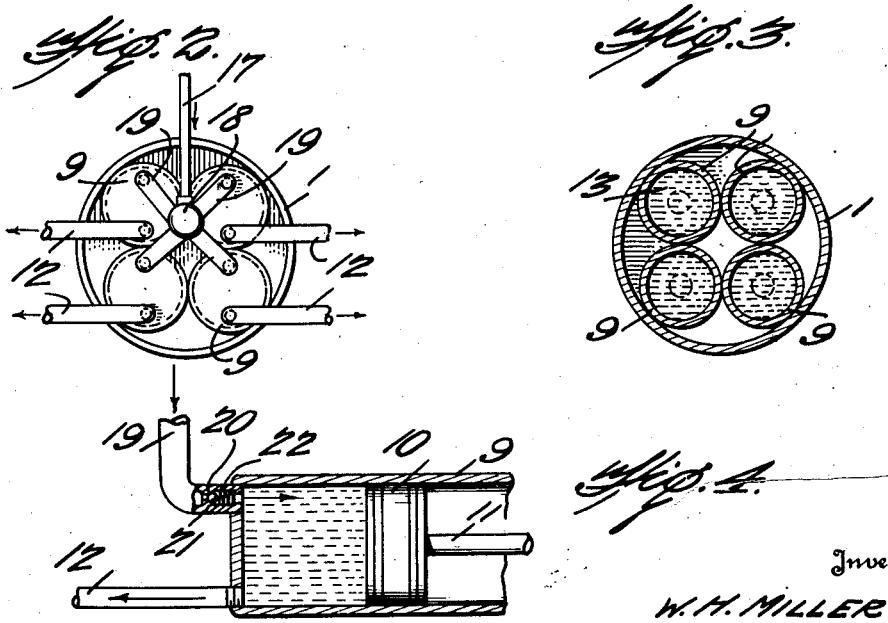
Figure 2 is a rear end view of the same, the replenishing tank being omitted.
Figure 3 is a section on line 3—3 of Figure 1.
Figure 4 is an enlarged broken longitudinal section of a pressure cylinder, illustrating particularly the cooperation of the replenishing system therewith.

As will be plain from the following description, the invention is particularly concerned with the pressure end of the system, and hence no illustration of the brakes or brake cylinders is deemed necessary.

As illustrated, the improvement contemplates the provision of a guide casing 1, preferably of cylindrical form, open at the rear end, as at 2, and closed at the forward end at 3 except for a guide opening 4 and aligned guide sleeve 5. A disk head 6 has free sliding and guiding movement in the casing 1 and is connected by a rod 7 which extends through the opening 4 and guide sleeve 5 to a manually operable brake pedal 8.

Fixed in the guide casing 1 beyond the disk head 6 toward the rear of the casing are four similar pressure cylinders 9 having peripheral contact one with the other and with the interior of the casing 1. A piston 10 is operative in each of the pressure cylinders 9, each piston being connected by a piston rod 11 with the disk head 6.

The pressure cylinders communicate at their rear ends through pipes 12 with the brake cylinders (not shown), so that on operation of the brake pedal and corresponding movement of the disk head 6, piston rods 11 and pistons 10, the liquid, here indicated at 13, with which each independent system is charged, is put under pressure and through the brake cylinders in a well understood manner the brakes are set.

It is to be particularly noted that each system, that is, each pressure cylinder 9, pipe 12 and brake operating parts, is wholly independent of any other system. There is no connection between them and if the systems are properly charged with liquid, it necessarily follows that, on operation of the brake pedal, identical pressures will be generated in each of the pressure cylinders. If under these circumstances one of the systems should develop a leak, it is at once apparent that the other systems are not affected and that such other systems will act with their normal pressure on the brakes exactly as if the ineffective system had not become ineffective.

It is a characteristic of such systems that incidental to leakage, either natural seepage through the joints or a break in such system, that the hydraulic medium be replaced from time to time, that is the respective systems must be recharged. As ordinarily provided in such systems, the recharging is operatively common to all the systems and hence under leakage of a pronounced character in any one system, all the systems are affected with a corresponding reduction in pressure.

It is with this replenishing detail of the system that the present invention is more particularly concerned. To provide for this, a replenishing tank 14 is mounted at a suitable elevation and includes a manually operable piston 15, actuated through member 16, and a supply pipe 17 opening from the tank preferably at the lowest point thereof. At the lower end of the supply pipe and preferably within the open end of the casing 1, the supply pipe 17 communicates with a manifold 18 from which independent supply tubes 19 lead to each of the pressure cylinders 9.

The supply tubes 19 open through the rear end of the pressure cylinders, that is through the end with which the pipes 12 communicate, and each of said supply tubes is provided immediately adjacent its pressure cylinder with a valve which opens under pressure from the supply tank but closes under pressure from the pressure cylinder. This valve may be of any conventional or serviceable form, being for the purpose of illustration here shown as a ball 20 arranged to cooperate with a seat 21 in the tube 19, a spring 22 normally holding the valve to its seat. The valve closes against its seat under pressure from within the pressure cylinder 9 and opens against the pressure of the spring 22 under pressure from the supply tank.

In the usual operation of the system, it will be appreciated that the hydraulic pressure generated in the movement of the brake pedal to operate the brakes is not communicated to the supply tank and assuming the tension of the spring 22 to exceed the weight of the column of liquid in the replenishing system, it will be apparent that each pressure cylinder is normally closed against the admission of liquid in the tank 14. If now, one of the systems should develop a serious leak or a leak through which the operative pressure of that system is so materially reduced that the brake controlled thereby is practically ineffective, it will follow that the liquid in that particular leaking system will gradually be lost through the leak. That particular system is then ineffective, but as the other systems are wholly independent and as the leaking system cannot normally receive a replenishing supply from the tank 14 when the pressure in any active pressure cylinder cannot force the liquid in that system through the replenishing tubes 19 and manifold 18 into the leaking system, it follows that the leaking system is entirely cut out and that the remaining non-leaking systems are just as effective for braking purposes as at any other time. There is absolutely no communication either through the replenishing side or pressure side, between the active systems and the leaking system.

Following the repair of the leak, however, the replenishing piston 15 is operated and the pressure thus generated forces the replenishing fluid through the supply tube 19 of the particular leaking system, past the valve 20 of that tube, and the repaired system is recharged. During this recharging, it is a merit of the present invention that such recharging must be uniform with the recharged condition of the other systems, for as soon as the pressure of the liquid delivered to the recharged system equals the pressure of the liquid in the previously charged systems, then there is a balanced pressure against all valves 20 and any further attempt to introduce liquid into the system being recharged will correspondingly open all the valves 20 and force liquid into all systems equally. This will be apparent from a moment's consideration of the construction. If all systems other than the system being recharged are filled with liquid, this liquid is necessarily under some little pressure. The valve in the system being recharged, however, is not under that pressure, as there is no liquid in such system. Replenishing pressure will then charge the system being replenished until the liquid delivered thereto is under a pressure equal to that in the other systems. All valves 20 are now under the same back or seating pressure and if attempt is made to force further fluid from the replenishing tank, this fluid pressure unseats all valves and at once insures equalization of normal pressure in all independent systems. Thereafter, under manual pressure of the brake pedal, the brake acting pressure of all systems must be equal, with the result of equal brake application.

What is claimed to be new is:

A hydraulic brake system including a guide casing, a plurality of pressure cylinders arranged within said guide casing, pipes leading from the cylinders to the brake elements, each pressure cylinder and pipe being wholly closed against any other pressure cylinder and pipe, a piston in each cylinder, a replenishing tank, means for subjecting the material in the tank to a selective pressure, a pipe leading from the replenishing tank into the guide casing, a manifold connected to said pipe within the guide casing and having communications with each of the pressure cylinders, a valve in each of said communications opening under replenishing pressure in excess of cylinder pressure, a disk head slidably guided in the casing beyond the cylinders, a connection between said disk head and each piston, and means operative through one end of the casing to actuate the disk head and thereby the pistons within the cylinders.

In testimony whereof we affix our signatures.

JAMES C. MONN.
WILLIAM H. MILLER.